United States Patent
Qin et al.

(10) Patent No.: US 12,221,943 B2
(45) Date of Patent: Feb. 11, 2025

(54) PRESSURE RELIEF VALVE AND FUEL CELL FLUID SUPPLY SYSTEM EQUIPPED WITH SAME

(71) Applicant: Robert Bosch GmbH, Stuttgart (DE)

(72) Inventors: Zhirong Qin, Jiangsu (CN); Zeyu Wu, Jiangsu (CN)

(73) Assignee: Robert Bosch GmbH, Stuttgart (DE)

(*) Notice: Subject to any disclaimer, the term of this patent is extended or adjusted under 35 U.S.C. 154(b) by 640 days.

(21) Appl. No.: 17/109,620

(22) Filed: Dec. 2, 2020

(65) Prior Publication Data

US 2021/0190026 A1    Jun. 24, 2021

(30) Foreign Application Priority Data

Dec. 4, 2019  (CN) .......................... 201911227789.3

(51) Int. Cl.
*F02M 63/00* (2006.01)
*F16K 17/04* (2006.01)

(52) U.S. Cl.
CPC ........... *F02M 63/005* (2013.01); *F16K 17/04* (2013.01)

(58) Field of Classification Search
CPC ..... F02M 63/005; F16K 17/04; F16K 17/383; F16K 17/32; F16K 17/1606; F16K 17/1613; F16K 17/1626; F17C 2205/0332
See application file for complete search history.

(56) References Cited

U.S. PATENT DOCUMENTS

| | | | | |
|---|---|---|---|---|
| 5,161,738 A * | 11/1992 | Wass | ..................... | G05D 23/026 137/72 |
| 5,275,194 A * | 1/1994 | Gray, Jr. | ................ | F16K 17/383 251/324 |
| 2017/0152960 A1 * | 6/2017 | Michnevitz | ........... | F16K 17/383 |
| 2018/0051819 A1 * | 2/2018 | Pittel | ..................... | F16K 17/162 |

FOREIGN PATENT DOCUMENTS

| | | | | |
|---|---|---|---|---|
| DE | 20014947 U1 * | 11/2000 | ........... | F16K 17/383 |
| GB | 1310978 A * | 3/1973 | | |

* cited by examiner

*Primary Examiner* — Logan M Kraft
*Assistant Examiner* — Joshua Campbell
(74) *Attorney, Agent, or Firm* — Maginot, Moore & Beck LLP

(57) ABSTRACT

A pressure relief valve includes a valve body with a hollow internal cavity. The internal cavity has two opposite ends, which are in communication with a high-pressure side and a low-pressure side of the pressure relief valve respectively. The pressure relief valve further includes a separating plate disposed in the valve body and located in the hollow internal cavity, and a penetrating member configured to slide linearly in the valve body. The penetrating member has a force applied thereto from the low-pressure side towards the high-pressure side by an elastic component located in the internal cavity. The pressure relief valve further includes a locking structure disposed in the valve body in a fixed manner and spaced apart from the separating plate. The penetrating member is locked in a cut-off state of the pressure relief valve by the locking structure.

11 Claims, 3 Drawing Sheets

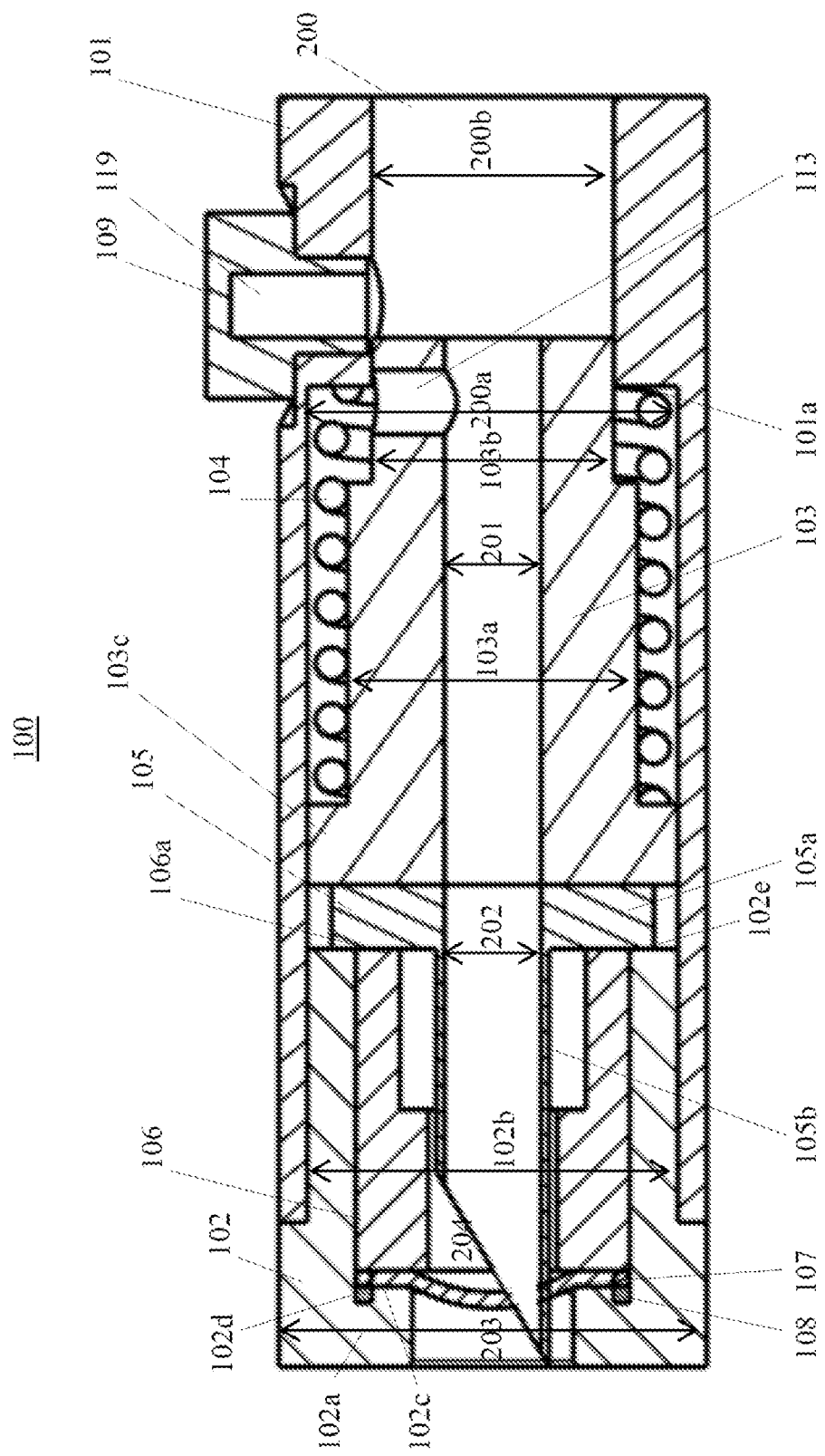

PRESSURE RELIEF VALVE AND FUEL CELL FLUID SUPPLY SYSTEM EQUIPPED WITH SAME

This application claims priority under 35 U.S.C. § 119 to patent application no. CN 2019 1122 7789.3, filed on Dec. 4, 2019 in China, the disclosure of which is incorporated herein by reference in its entirety.

The disclosure relates generally to a pressure relief valve, in particular a pressure relief valve triggered on the basis of temperature.

BACKGROUND

Due to environmental protection (e.g. preventing global warming, preventing atmospheric pollution, saving energy and reducing emissions, etc.) considerations, new energy vehicles are being taken more and more seriously, and are being developed to an ever greater extent, by manufacturers. Fuel cells, as a device for supplying motive power in new energy vehicles, are receiving more and more attention from researchers and markets.

A fuel cell needs a gas such as high-pressure hydrogen or high-pressure air to be supplied into a battery to undergo a corresponding reaction, in order to generate electric power for driving the vehicle to travel. In general, these high-pressure gases will be stored in a high-pressure tank of the fuel cell, and are supplied into the battery as required via a supply system. Taking hydrogen as an example, this will generally be stored in a high-pressure tank at a gas pressure of more than 350 bar. The supply system comprises a high-pressure pipeline and a low-pressure pipeline, and the high-pressure tank is series-connected in the high-pressure pipeline. To ensure that the vehicle will not explode due to an excessive increase in gas pressure in the high-pressure tank caused by high temperatures in an accident, e.g. if the vehicle catches fire, thereby causing more serious personal injury, a pressure relief valve must be provided for the high-pressure tank or the high-pressure pipeline of the supply system.

SUMMARY

The disclosure proposes a pressure relief valve triggered on the basis of temperature, in order to ensure that a high-pressure tank or high-pressure pipeline can automatically decompress when a specific temperature is exceeded.

According to one aspect of the disclosure, a pressure relief valve is provided, comprising:

a valve body, with a hollow internal cavity being defined in the valve body, the hollow internal cavity having two opposite ends, which are in communication with a high-pressure side and a low-pressure side of the pressure relief valve respectively; and a separating plate disposed in the valve body, the separating plate being located in the hollow internal cavity;

a penetrating member disposed in such a way as to be capable of sliding linearly in the valve body, the penetrating member having a force applied thereto from the low-pressure side towards the high-pressure side by an elastic component located in the internal cavity; and a locking means disposed in the valve body in a fixed manner and spaced apart from the separating plate, the penetrating member being locked in a cut-off state of the pressure relief valve by means of the locking means; in the cut-off state, the high-pressure side and the low-pressure side are isolated from one another in a sealed fashion by the separating plate, and the penetrating member is configured such that the penetrating member cannot be locked when a specified temperature is exceeded, such that the penetrating member moves from the low-pressure side towards the high-pressure side under the action of the force, and finally the pressure relief valve is in an open state; in the open state, the separating plate is penetrated by the penetrating member such that the high-pressure side and the low-pressure side are in communication with each other. Thus, since the locking means is triggered on the basis of temperature, reliable protection can be provided when accidental high temperature occurs. In addition, since the locking means is disposed so as to be separate from the separating plate, it is possible to ensure that the problem of accidental leakage due to failure of the locking means will not occur.

Optionally, the locking means comprises a locking pin, the locking pin passing through a through-hole formed in the valve body and at least partially extending into the penetrating member, in order to lock the penetrating member in the cut-off state.

Optionally, the locking pin is made of a fusible alloy, so that the specified temperature is in the range of 110° C.±5° C.

Optionally, the penetrating member is integrally formed.

Optionally, the penetrating member comprises a spring seat, and a piercing component mounted on the spring seat and configured to penetrate the separating plate, and the force is applied to the spring seat. Due to the split design of the penetrating member, the cost of expensive materials used to manufacture the piercing component can be reduced.

Optionally, the elastic component comprises a coil spring, the coil spring being fitted round at least a partial outer surface of the spring seat, one end of the coil spring abutting a part of the valve body, and another, opposite end of the coil spring abutting a part of the spring seat.

Optionally, the separating plate is designed such that a part thereof in the hollow internal cavity protrudes towards the high-pressure side, and this part is shaped in such a way as to form part of a spherical surface. Thus, for a given thickness of separating plate, the separating plate is enabled to withstand a greater fluid pressure.

Optionally, an axially penetrating hollow first internal cavity is formed in the spring seat, an axially penetrating hollow second internal cavity is formed in the piercing component, and the internal cavity of the valve body is in communication with the first internal cavity and the second internal cavity.

Optionally, the piercing component has a pointed end formed by an oblique face, so that in a penetrated state of the pressure relief valve, the pointed end passes through the separating plate and causes the second internal cavity to be in communication with the high-pressure side, thereby enabling rapid relief of pressure when the separating plate is pierced.

Optionally, the separating plate isolates the high-pressure side and low-pressure side from one another in a sealed fashion via a sealing ring disposed in the internal cavity of the valve body, and the sealing ring is spaced apart from the locking means in an axial direction at least via the piercing component.

According to another aspect of the disclosure, also provided is a fluid supply system for use in a fuel cell vehicle, comprising:

a high-pressure fluid tank; and a high-pressure pipeline in fluid communication with the high-pressure fluid tank, wherein the pressure relief valve as described above is provided in the high-pressure fluid tank and/or the high-pressure pipeline, so that the high-pressure side of the pressure relief valve is in communication with high-pressure fluid in the high-pressure fluid tank and/or the high-pressure pipeline, and the low-pressure side of the pressure relief valve is in communication with the atmosphere.

Using the above-described technical approach of the disclosure, it is possible to ensure that the high-pressure tank or high-pressure pipeline can be rapidly and reliably relieved of pressure at abnormally high temperatures, and the pressure-bearing ability of the pressure relief valve in conventional circumstances is somewhat improved.

BRIEF DESCRIPTION OF THE DRAWINGS

A more comprehensive understanding of the principles and various aspects of the disclosure will be gained from the detailed explanation below in conjunction with the following drawings. It must be pointed out that different drawings might be drawn to different scales for the purposes of clear explanation, but this will not affect the understanding of the disclosure. In the drawings:

FIG. 3 shows schematically a pressure relief valve structure according to an embodiment of the disclosure, wherein the pressure relief valve is in a pressure relief state.

DETAILED DESCRIPTION

Figure 1:
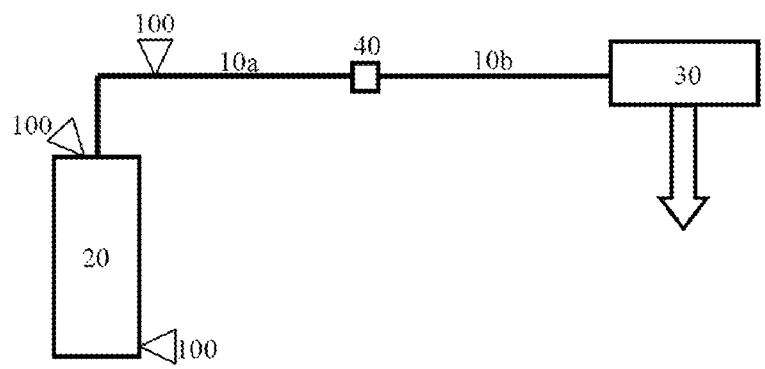
FIG. 1 shows a simplified schematic drawing of a fluid supply system equipped with the pressure relief valve according to the disclosure.

In the drawings, structurally identical or functionally similar features are indicated by identical reference labels. In addition, in the drawings, hatching lines of the same component might be presented in different ways in different views, but it should not be imagined that this will have any effect on the understanding of the technical solution of the disclosure. For example, in FIGS. 2 and 3, the hatching lines of the same component will have different densities and lie in different directions for reasons relating to the way in which the drawings are produced, but this will not affect the understanding of the technical solution of the disclosure.

FIG. 1 shows schematically a part of a fluid supply system 1 that can be used in a fuel cell vehicle. For example, the fluid supply system 1 may provide a gas such as high-pressure hydrogen or high-pressure air for a battery of a fuel cell of the vehicle, but may also provide a liquid such as water for normal operation of the fuel cell. In the disclosure, the gas and liquid are collectively called fluid. The fluid supply system 1 comprises a high-pressure fluid tank 20, with high-pressure fluid being stored therein.

The fluid supply system 1 is described below, taking hydrogen alone as an example. However, those skilled in the art will understand that any other suitable high-pressure fluid for ensuring normal operation of the fuel cell may also be applied to the technical content associated with the description of hydrogen and involving the following.

The high-pressure fluid tank 20 may be a hydrogen tank. The high-pressure fluid tank 20 is connected in a sealed fashion to a high-pressure pipeline 10a of the fluid supply system 1, wherein the high-pressure pipeline 10a is fluid-connected via a pressure regulating valve 40 to a low-pressure pipeline 10b of the fluid supply system 1. The fluid supply system 1 further comprises a supply nozzle 30 disposed in the low-pressure pipeline 10b. Thus, high-pressure hydrogen is first of all stored in the high-pressure fluid tank 20; high-pressure hydrogen is outputted from the high-pressure fluid tank 20 via the high-pressure pipeline 10a as needed, and enters the low-pressure pipeline 10b after being reduced in pressure by the pressure regulating valve 40, and is further supplied to the battery of the fuel cell via the supply nozzle 30, in order to realize an electrochemical reaction and generate electric power.

When the fluid supply system 1 is damaged due to the vehicle having an accident, e.g. being involved in a collision, the high-pressure fluid tank 20 might be subjected to an abnormal high temperature, causing an abnormal increase in fluid pressure therein and in turn causing an explosion. In order to avoid the possibility of the high-pressure fluid tank 20 exploding due to this kind of accident, a pressure relief valve according to the disclosure may be disposed in the high-pressure fluid tank 20 and/or the high-pressure pipeline 10a. For example, as indicated by the arrows 100, such a pressure relief valve may be disposed at an outlet of the high-pressure fluid tank 20, e.g. connected in parallel with an output valve (not shown) at the outlet; and/or such a pressure relief valve may be disposed in a wall of the high-pressure fluid tank 20.

Figure 2:
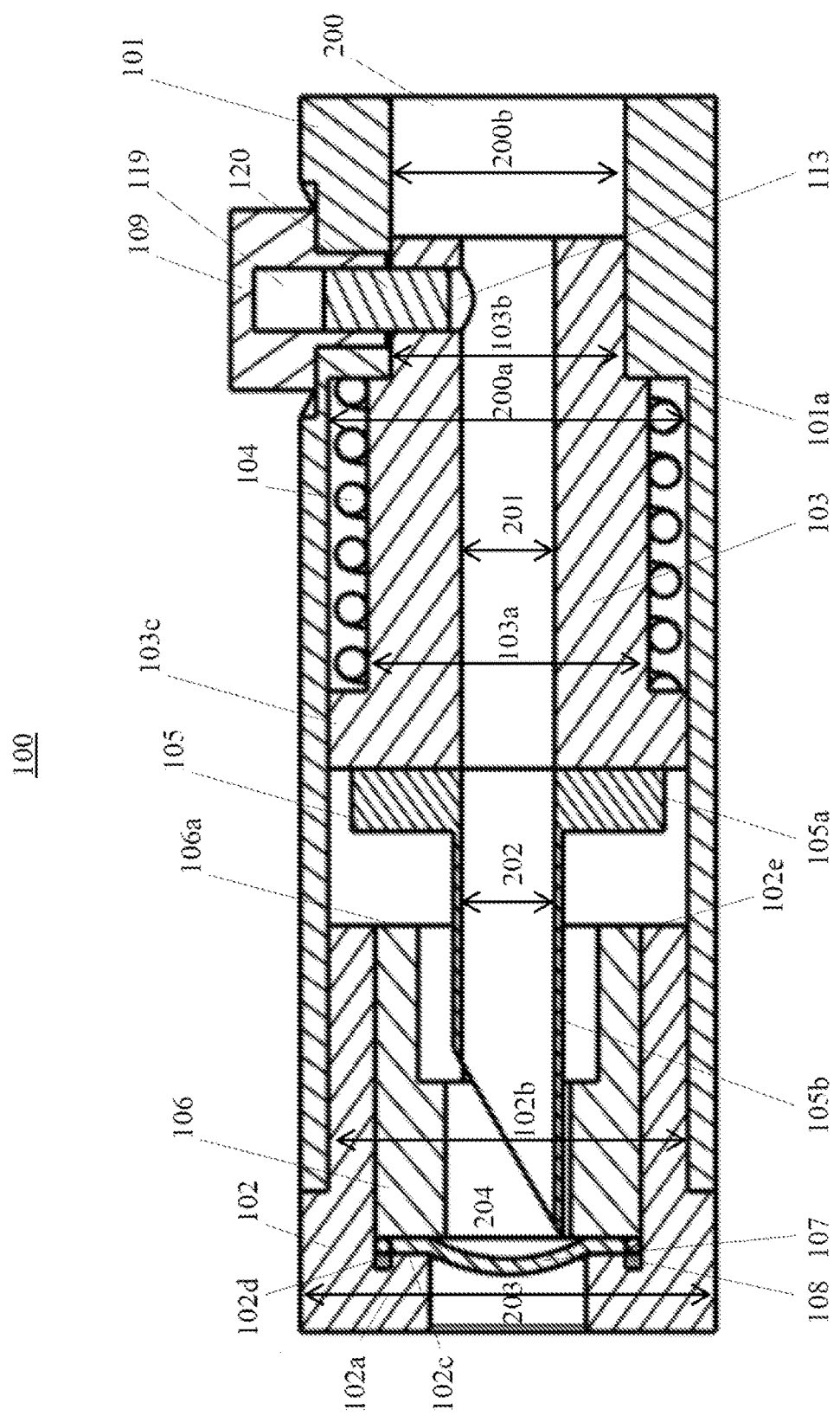
FIG. 2 shows schematically a pressure relief valve structure according to an embodiment of the disclosure, wherein the pressure relief valve is in a cut-off state.

An example of the pressure relief valve 100 is now described with reference to FIGS. 2 and 3. As shown in the figures, the pressure relief valve 100 comprises a substantially tubular valve body component 101. A hollow internal cavity 200 is defined by an inner wall of the valve body component 101. The internal cavity 200 has two openings opposite each other, one of these openings being at the left side in the figures and the other being at the right side in the figures; the two openings are in communication with a high-pressure side and a low-pressure side of the pressure relief valve 100 respectively. In FIGS. 1 and 2, the left side is regarded as the high-pressure side of the pressure relief valve 100, and is for example in communication with the outlet of the high-pressure fluid tank 20 or in communication with the high-pressure pipeline 10a; the right side is regarded as the low-pressure side of the pressure relief valve 100, and is for example in communication with the external atmosphere or in communication with another low-pressure fluid pipeline.

From the high-pressure side of the valve body component 101, a base component 102 is installed in the valve body component 101 and partially exposed. For example, a thread is formed on an outer peripheral surface of the base component 102, and a thread is also formed on a corresponding inner peripheral surface of the valve body component 101, in order that the two components can be screwed together. A hollow internal cavity 203 is also formed in the base component 102. Once the base component 102 has been installed in the valve body component 101, the internal cavity 203 can be in communication with the internal cavity 200. In this case, an opening of the internal cavity 203 in communication with the internal cavity 200 (e.g. the left-side opening in FIG. 2) is in communication with the high-pressure side of the pressure relief valve 100.

An outer wall of the base component 102 is formed to have a large-diameter portion 102a and a small-diameter portion 102b, wherein the outer diameter of the large-diameter portion 102a may be substantially the same as the outer diameter of the valve body component 101, and an external thread is formed on the small-diameter portion 102b, in order to engage with an internal thread formed on an inner wall of the valve body component 101. The base component 102 and valve body component 101 form a valve body of the pressure relief valve 101 after being fitted together.

In the internal cavity 203 of the base component 102, an inner wall of the base component 102 forms a step face 102c, which is an annular face perpendicular to a longitudinal axis of the valve body. The step face 102c is substantially located in a region where the large-diameter portion 102a of the base component 102 is positioned in the direction of the longitudinal axis. An annular groove 102d is also formed around the step face 102c, and is configured to have a sealing ring 108 installed therein. An inner sleeve 106 is installed in the base component 102. An external thread is formed on an outer wall of the inner sleeve 106, in order to engage with an internal thread formed on an inner wall of the base component 102. The inner sleeve 106 is also substantially tubular, and has two flat end faces opposite each other. The inner sleeve 106 has a hollow internal cavity 204 defined by an inner wall thereof.

In addition, a separating plate 107 is clamped and fixed between the base component 102 and the inner sleeve 106. The separating plate 107 is configured to isolate the high-pressure side and low-pressure side of the pressure relief valve 100 from one another in a sealed fashion, under the action of a securing force between the base component 102 and the inner sleeve 106. For example, when assembly is performed, the sealing ring 108 may first of all be placed into the annular groove 102d of the base component 102; the thickness of the sealing ring 108 may be configured to be slightly greater than the axial depth of the annular groove 102d, such that when the separating plate 107 is installed in the direction of the step face 102c of the base component 102, it will first come into contact with the sealing ring 108. The inner sleeve 106 is then screwed via the threads into the base component 102 from the side where an end face 102e of the base component 102 is positioned, finally causing one flat end face of the inner sleeve 106 to press against the separating plate 107 and in turn squeeze the sealing ring 108. When the inner sleeve 106 is finally screwed into place in the base component 102, the flat end face 106a of the inner sleeve 106 that is opposite the flat end face in contact with the separating plate 107 can be flush with the end face 102e of the base component 102. The cooperation of the sealing ring 108 and the separating plate 107 ensures gas-tight separation of the internal cavities at the two opposite sides of the separating plate 107, i.e. part of the internal cavity 203 located at that side of the separating plate 107 which is close to the high-pressure side of the pressure relief valve 100 (the left side in FIGS. 1 and 2) and the internal cavity 204 of the inner sleeve 106 located at that side of the separating plate 107 which is close to the low-pressure side of the pressure relief valve 100 (the right side in FIGS. 1 and 2).

The internal cavity 200 of the valve body component 101 comprises a large-diameter internal cavity portion 200a and a small-diameter internal cavity portion 200b which are defined by inner walls of the valve body component 101, wherein the large-diameter internal cavity portion 200a and small-diameter internal cavity portion 200b are in communication with the internal cavity 204 of the inner sleeve 106 once the valve body component 101 has been fitted into place. The large-diameter internal cavity portion 200a is connected to the small-diameter internal cavity portion 200b at a step face 101a formed by an inner wall of the valve body component 101. In addition, a spring seat 103 is slideably located in the internal cavity 200 of the valve body component 101. The spring seat 103 is also a hollow structure, and an inner wall thereof defines a hollow internal cavity 201 of the spring seat 103. Viewed from the outside, the spring seat 103 also comprises a large-diameter portion 103a and a small-diameter portion 103b, wherein the large-diameter portion 103a further comprises an annular flange 103c.

The large-diameter portion 103a of the spring seat 103 may be slideably supported in the large-diameter internal cavity portion 200a of the valve body component 101 by an inner wall of the valve body component 101 using the annular flange 103c; the small-diameter portion 103b of the spring seat 103 may be slideably supported in the small-diameter internal cavity portion 200b of the valve body component 101 by an inner wall of the valve body component 101. The outer diameter of the large-diameter portion 103a of the spring seat 103 is smaller than the diameter of the large-diameter internal cavity portion 200a of the valve body component 101, such that a coil spring 104 can be arranged between an outer diameter part of the spring seat 103, in particular of the large-diameter portion 103a thereof, and an inner wall of the valve body component 101. One end of the coil spring 104 may abut the step face 101a of the valve body component 101, and another, opposite end may abut the annular flange 103c of the spring seat 103.

Furthermore, a piercing component 105 is fixed on an end face, opposite the coil spring 104, of the annular flange 103c. The piercing component 105 comprises a base 105a, and a sharp part 105b that is integrally formed with the base 105a and extends axially from the base 105a. The piercing component 105 is also a hollow structure, and defines a hollow internal cavity 202 that runs axially through the base 105a and the sharp part 105b. A through-hole may be formed in the base 105a, in order to fix the base 105a to the annular flange 103c via a bolt, as shown in FIGS. 2 and 3. The sharp part 105b has a pointed end formed by an oblique face, for piercing the separating plate 107.

FIG. 2 shows a schematic sectional view of the pressure relief valve 100 in a cut-off state; in the cut-off state, the separating plate 107 remains intact and undamaged, such that the high-pressure side and low-pressure side of the pressure relief valve 100 are isolated from one another. FIG. 3 shows a schematic sectional view of the pressure relief valve 100 in a pressure relief state; in the pressure relief state, the separating plate 107 is pierced by the sharp part 105b, such that the high-pressure side and low-pressure side of the pressure relief valve 100 are in communication with each other.

In a region where the small-diameter internal cavity portion 200b of the internal cavity 200 of the valve body component 101 is positioned, a radial through-hole is formed in a wall of the valve body component 101, in which through-hole a plug member 109 can be inserted. A blind hole 119 is formed in the plug member 109; a locking pin 120 can be inserted in the blind hole 119 for example in a shape-fitted manner or friction-fitted manner, so as to be partially exposed through the blind hole 119. In the cut-off state as shown in FIG. 2, the plug member 109 is inserted in the through-hole in a sidewall of the valve body component 101, and the exposed part of the locking pin 120 is inserted into a radial through-hole 113 in the small-diameter portion 103b of the spring seat 103, thereby locking the spring seat 103, and thus the piercing component 105, in place in the axial direction.

The outer diameter of the sharp part 105b of the piercing component 105 is smaller than the diameter of the hollow internal cavity 204 of the inner sleeve 106, thus the sharp part 105b can extend into the internal cavity 204. However, in the cut-off state as shown in FIG. 2, the pointed end of the sharp part 105*b* is spaced apart from the separating plate 107 by a certain distance, while the base 105*a* is also spaced apart from the flat end face 106*a* of the inner sleeve 106 and/or the end face 102*e* of the base component 102 by a certain distance.

For example, when the pressure relief valve 100 is assembled, the coil spring 104 can first be placed in the large-diameter internal cavity portion 200*a* of the valve body component 101 such that one end thereof is in contact with the step face 101*a*; the spring seat 103 with the piercing component 105 already fixed thereto is then inserted into the large-diameter internal cavity portion 200*a*, such that the annular flange 103*c* of the spring seat 103 comes into contact with the other, opposite end of the coil spring 104. Next, a special tool is used to press the spring seat 103, such that the small-diameter portion 103*b* thereof slides axially in the small-diameter internal cavity portion 200*b* of the valve body component 101, and finally a step face between the large-diameter portion 103*a* and small-diameter portion 103*b* of the spring seat 103 comes into contact with the step face 101*a* of the valve body component 101, at which time the radial through-hole 113 of the spring seat 103 and the through-hole in the valve body component 101 for insertion of the plug member 109 are coaxial. Thus, the plug member 109 can be inserted into the through-hole of the valve body component 101, in order to lock the spring seat 103 and piercing component 105 axially in place in the valve body component 101. Next, the base component 102 with the separating plate 107 and inner sleeve 106 already fitted thereto is screwed into the valve body component 101 from the high-pressure side, such that the sharp part 105*b* of the piercing component 105 enters the hollow internal cavity 204 of the inner sleeve 106, and the pointed end of the sharp part 105*b* is spaced apart from the separating plate 107 by a certain distance, while the base 105*a* is also spaced apart from the flat end face 106*a* of the inner sleeve 106 and/or the end face 102*e* of the base component 102 by a certain distance.

The axial length of the piercing component 105 may be set such that when the pressure relief valve 100 is assembled and in the cut-off state as shown in FIG. 2, the pointed end of the sharp part 105*b* is just out of contact with the separating plate 107, thereby ensuring that if the piercing component 105 is merely moved towards the separating plate 107, the pointed end of the sharp part 105*b* must be able to touch the separating plate 107. In addition, the coil spring 104 is configured to always apply to the spring seat 103 a force tending to cause it to move from the low-pressure side of the pressure relief valve 100 towards the high-pressure side.

In the embodiment of the disclosure, the locking pin 120 may be made of a fusible material, e.g. a fusible alloy. For example, such a fusible alloy may be selected from any suitable fusible alloy currently available on the market, as long as the strength thereof can suddenly weaken in a specific temperature range, so that the locking pin 120 is unable to support the force of the coil spring 104 to maintain the cut-off state of the pressure relief valve 100. Taking hydrogen as an example, the fusible alloy used to make the locking pin 120 may be selected so as to have a melting point in the range of 110° C.±5° C. The dimensions of the locking pin 120 are designed such that below this range, the locking pin 120 is able to support the force of the coil spring 104 in order to keep the pressure relief valve 100 in the cut-off state as shown in FIG. 2.

In the process of using the pressure relief valve 100, the pressure relief valve 100 is for example installed at the outlet of the high-pressure fluid tank 20, in the cut-off state as shown in FIG. 2, such that the high-pressure side of the pressure relief valve 100 is in communication with high-pressure fluid, and the low-pressure side of the pressure relief valve 100 is in communication with the atmosphere or another low-pressure pipeline. In the course of normal use, the locking pin 120 locks the spring seat 103 immovably, thus the separating plate 107 isolates the high-pressure side from the low-pressure side. When the ambient temperature of the pressure relief valve 100 reaches or exceeds some value in the range of 110° C.±5° C., the state of the locking pin 120 changes such that the strength thereof is not enough to support the force of the coil spring 104. For example, the locking pin 120 breaks or is truncated, and under the action of the force of the coil spring 104, the spring seat 103 is rapidly driven towards the high-pressure side, taking the piercing component 105 with it, such that the sharp part 105*b* of the piercing component 105 pierces the separating plate 107, and finally, due to the base 105*a* coming into contact with the flat end face 106*a* and/or the end face 102*e* of the base component 102, the piercing component 105 will be stopped, such that the pressure relief valve 100 is in the pressure relief state as shown in FIG. 3. In the pressure relief state, the internal cavities 203, 204, 202, 201 and 200 are all in communication with each other, i.e. the high-pressure side and low-pressure side of the pressure relief valve 100 are in communication with each other, such that high-pressure fluid can rapidly empty from the high-pressure fluid tank 20, avoiding an accident. In the technical solution of the disclosure, the locking pin 120 forming a pressure relief valve locking means is configured to fail only at a specific temperature or in a temperature range, and the locking pin 120 is designed to be spaced apart from the sealing ring 108 forming a pressure relief valve sealing structure; thus, the locking means of the pressure relief valve 100 will not affect the reliability of the sealing structure. That is to say, slow leakage of high-pressure fluid from a container at the high-pressure side, e.g. the high-pressure fluid tank 20, due to ageing of the locking means because the locking means and sealing structure have been integrated with one another will not occur. In addition, a locking means that is activated on the basis of temperature better ensures that the pressure relief valve 100 can open rapidly at an abnormally high temperature.

As shown in FIGS. 2 and 3, in an embodiment of the disclosure, the separating plate 107 is designed such that a part of the separating plate 107 that is within the hollow internal cavity 203 of the base component 102 protrudes towards the high-pressure side and is shaped in such a way as to form part of a spherical surface. In the disclosure, the expression "the separating plate protrudes towards the high-pressure side and is shaped in such a way as to form part of a spherical surface" means that the centre of the sphere is close to the low-pressure side opposite the high-pressure side. Due to this design, pressure from high-pressure fluid is in the opposite direction to that of the protrusion of the separating plate 107, thereby ensuring that for the same thickness of separating plate 107, the separating plate 107 of the disclosure can withstand a greater fluid pressure than a flatter separating plate.

In addition, in an embodiment of the disclosure, the piercing component 105 and spring seat 103 are then fitted together, thereby forming a penetrating member capable of sliding linearly in the valve body, wherein the spring seat 103 is made of a cheaper, common, machine-manufactured steel material or more lightweight aluminium alloy with no need for special heat treatment, but the piercing component 105 is made of a more expensive, special-purpose, high-hardness material with special heat treatment; thus, it is possible to ensure that the pressure relief valve according to the disclosure is manufactured at a rational cost and a light weight. Those skilled in the art will know that in an alternative embodiment, the piercing component 105 and spring seat 103 may also be made integrally as the penetrating member from a more expensive, special-purpose, high-hardness material with special heat treatment.

In an embodiment of the disclosure, the penetrating member applies a force from the low-pressure side towards the high-pressure side via the coil spring 104; however, in an alternative embodiment, the coil spring 104 may also be replaced by another elastic component having the same function. For example, in an alternative embodiment, such an elastic component may also be a hollow elastic corrugated tube structure arranged in the internal cavity of the valve body, being fitted round a part of the penetrating member, so as to apply a force, acting from the low-pressure side towards the high-pressure side, to the penetrating member relative to the valve body.

In the embodiment shown in the drawings, the locking pin 120 forms the locking means according to the disclosure, being configured to lock the piercing component 105 and/or spring seat 103 as part of the penetrating member in the cut-off state of the pressure relief valve 100. However, those skilled in the art will know that the locking means is not limited to the example shown. For example, the quantity of the locking pin 120 may be one, or more than one. As another example, in an alternative embodiment, the locking means may comprise a structure of another shape made of a fusible alloy, which acts between the valve body and the spring seat 103, in order to lock the spring seat 103 relative to the valve body.

Although specific embodiments of the disclosure have been described here in detail, these are provided solely for explanatory purposes, and should not be regarded as limiting the scope of the disclosure. In addition, those skilled in the art will know that the various embodiments described herein may be used in combination with each other. Various substitutions, changes and modifications can be conceived, on condition that the spirit and scope of the disclosure are not deviated from.

What is claimed is:

1. A pressure relief valve, comprising:
   a valve body defining a hollow internal cavity having two opposite ends in communication with a high-pressure side and a low-pressure side of the pressure relief valve respectively;
   a separating plate located in the hollow internal cavity;
   a penetrating member configured to slide linearly in the valve body;
   an elastic component located in the hollow internal cavity and configured to apply a force to the penetrating member from the low-pressure side towards the high-pressure side; and
   a locking structure disposed in the valve body in a fixed manner and spaced apart from the separating plate, the locking structure configured to lock the penetrating member in a cut-off state of the pressure relief valve, the locking structure comprising:
      a plug member arranged in a through-hole of the valve body, the plug member defining a blind hole that extends radially into the plug member; and
      a locking pin arranged in the blind hole of the plug member and extending at least partially into the penetrating member so as to lock the penetrating member in the cut-off state,
   wherein in the cut-off state, the high-pressure side and the low-pressure side are fluidically isolated from one another by the separating plate, and the penetrating member cannot be locked when a specified temperature is exceeded, such that the penetrating member moves from the low-pressure side towards the high-pressure side from the force, and
   wherein in an open state of the pressure relief valve, the separating plate is penetrated by the penetrating member, such that the high-pressure side and the low-pressure side are in fluid communication with each other.

2. The pressure relief valve according to claim 1, wherein:
   the locking pin is made of a fusible alloy, and
   the specified temperature is 110° C.±5° C.

3. The pressure relief valve according to claim 1, wherein the penetrating member is integrally formed.

4. The pressure relief valve according to claim 1, wherein:
   the penetrating member comprises:
      a spring seat into which the locking pin at least partially extends in the cut-off state; and
      a piercing component mounted on the spring seat and configured to penetrate the separating plate, and
   the elastic component applies the force to the spring seat.

5. The pressure relief valve according to claim 4, wherein:
   the elastic component comprises a coil spring,
   the coil spring extends around at least a portion of an outer surface of the spring seat,
   a first end of the coil spring abuts the valve body, and
   an opposite second end of the coil spring abuts the spring seat.

6. The pressure relief valve according to claim 4, wherein:
   the spring seat defines an axially penetrating hollow first internal cavity,
   the piercing component defines an axially penetrating hollow second internal cavity, and
   the internal cavity of the valve body is in fluid communication with the first internal cavity and the second internal cavity.

7. The pressure relief valve according to claim 6, wherein the piercing component defines a pointed end formed by an oblique face, such that in a penetrated state of the pressure relief valve, the pointed end passes through the separating plate and fluidically connects the second internal cavity to the high-pressure side.

8. The pressure relief valve according to claim 4, wherein:
   the separating plate includes a sealing ring configured to isolate fluidically the high-pressure side and the low-pressure side,
   the sealing ring is located in the hollow internal cavity of the valve body, and
   the sealing ring is spaced apart from the locking structure in an axial direction at least via the piercing component.

9. The pressure relief valve according to claim 1, wherein a part of the separating plate located in the hollow internal cavity protrudes towards the high-pressure side, and is shaped to form part of a spherical surface.

10. The pressure relief valve according to claim 1, wherein the plug member closes the through-hole of the valve body.

11. A fluid supply system for use in a fuel cell vehicle, the fluid supply system comprising:
   a high-pressure fluid tank;

a high-pressure pipeline in fluid communication with the high-pressure fluid tank; and a pressure relief valve operably connected to the high-pressure fluid tank and/or the high-pressure pipeline, the pressure relief valve including:
- a valve body defining a hollow internal cavity having two opposite ends in communication with a high-pressure side and a low-pressure side of the pressure relief valve respectively;
- a separating plate located in the hollow internal cavity;
- a penetrating member configured to slide linearly in the valve body;
- an elastic component located in the hollow internal cavity and configured to apply a force to the penetrating member from the low-pressure side towards the high-pressure side; and
- a locking structure disposed in the valve body in a fixed manner and spaced apart from the separating plate, the locking structure configured to lock the penetrating member in a cut-off state of the pressure relief valve, the locking structure comprising:
  - a plug member arranged in a through-hole of the valve body, the plug member defining a blind hole that extends radially into the plug member; and
  - a locking pin arranged in the blind hole of the plug member and extending at least partially into the penetrating member so as to lock the penetrating member in the cut-off state, wherein in the cut-off state, the high-pressure side and the low-pressure side are fluidically isolated from one another by the separating plate, and the penetrating member cannot be locked when a specified temperature is exceeded, such that the penetrating member moves from the low-pressure side towards the high-pressure side from the force, wherein in an open state of the pressure relief valve, the separating plate is penetrated by the penetrating member, such that the high-pressure side and the low-pressure side are in fluid communication with each other, wherein the high-pressure side of the pressure relief valve is in fluid communication with high-pressure fluid in the high-pressure fluid tank and/or the high-pressure pipeline, and wherein the low-pressure side of the pressure relief valve is in fluid communication with the atmosphere.

* * * * *